Sept. 14, 1937.  W. WHARTON  2,093,179
WIND SCREEN FOR MOTOR ROAD VEHICLES
Filed July 1, 1935  2 Sheets-Sheet 1
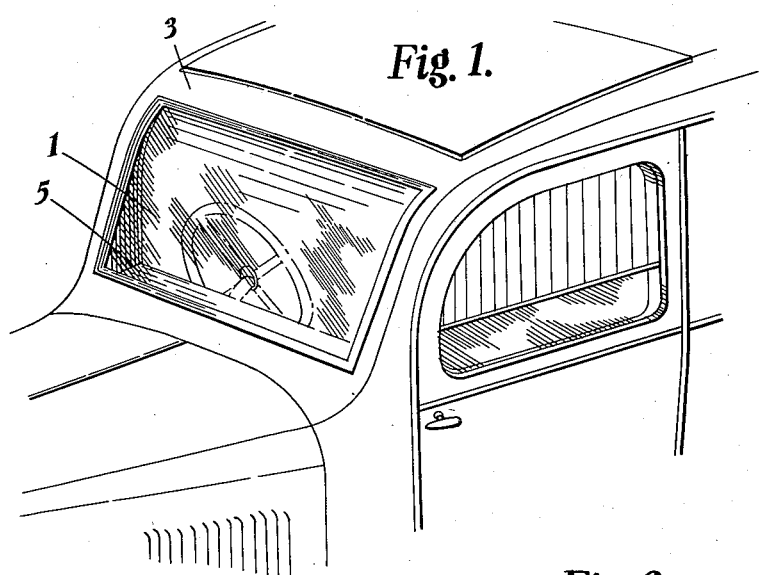
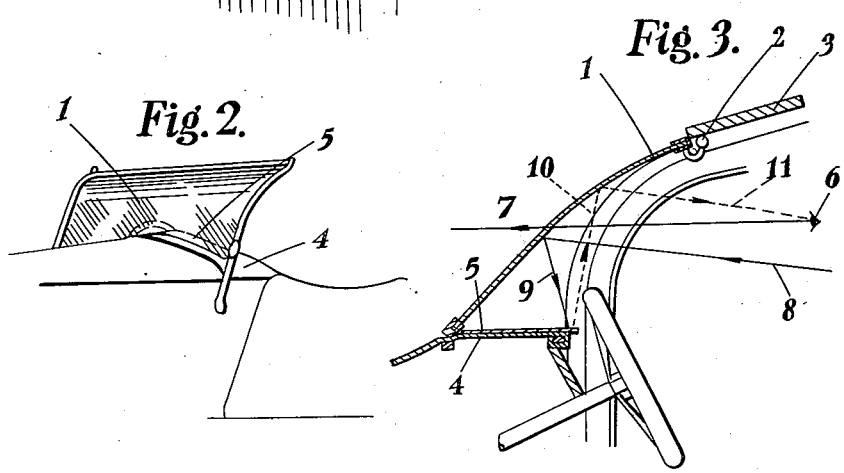
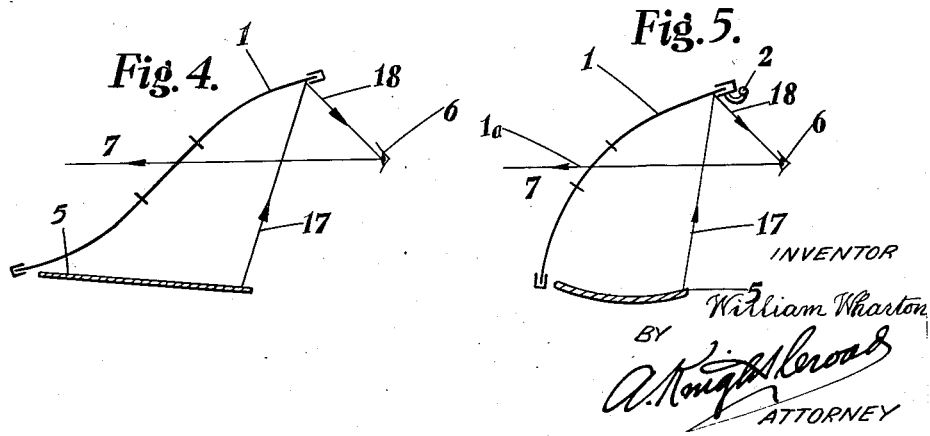
INVENTOR
William Wharton
BY
A. Knight Leroad
ATTORNEY Sept. 14, 1937.  W. WHARTON  2,093,179
WIND SCREEN FOR MOTOR ROAD VEHICLES
Filed July 1, 1935  2 Sheets-Sheet 2

INVENTOR
William Wharton
BY
ATTORNEY

Patented Sept. 14, 1937

2,093,179

UNITED STATES PATENT OFFICE 2,093,179

WIND-SCREEN FOR MOTOR ROAD VEHICLES

William Wharton, Kendal, England

Application July 1, 1935, Serial No. 29,222
In Great Britain September 4, 1934

3 Claims. (Cl. 296—84)

This invention relates to wind-screens for motor road vehicles and it has for its object to eliminate or reduce reflections and the like thereon caused by glaring head-lamps on vehicles, sun rays, lights in the streets from lamps or shop windows or other sources of illumination, and to this end it is proposed to form the screen of a flat or curved, or, partly flat and partly curved, sheet of transparent material, said sheet being straight in horizontal section but set at an angle to the normal line of vision whereby the reflections from external and/or internal sources of illumination are deflected from the eyes of the driver, it being arranged that the only direction from which the screen can receive light adapted to be directed by reflection to the eyes of the driver shall be from a region or surface of light absorbing material.

In the accompanying drawings which illustrate some embodiments of this invention:—

Figure 1 is a perspective view illustrating the application of the invention to a saloon body of a motor road vehicle;

Figure 2 is a perspective view illustrating the application of the invention to an open or touring body, and, Figures 3 to 8 are vertical sections diagrammatically illustrating various embodiments of this invention.

Figure 6:
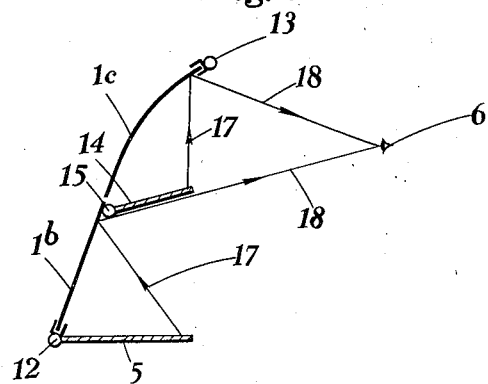

Broadly stated according to this invention a region of light absorbing material, such as a strip of black velvet or a part having a black matt surface is arranged below the normal area of vision and to the rear of and adjacent the lower edge of the wind-screen which is so shaped that all rays reaching the eyes of the driver from the screen by reflection must emanate from the region of light absorbing material, or in other words the region of light absorbing material is the only object visible to the driver by reflection from the wind-screen. To secure this with the minimum area of light absorbing surface the section of the screen in a vertical plane should be elliptical with foci at the eye and on the light absorbing surface respectively, but other considerations such as stream-lining and appearance may render modified shapes advisable which require a larger area of light absorbing surface.

The screen, according to this invention, is straight in horizontal section and disposed at an angle to the vertical with the lower edge forward of the upper edge; the screen may be curved in a vertical plane, but to obtain the best results a small portion of the screen at the level of the driver's eyes should preferably be free from curvature, though inclined, as otherwise bright lights from approaching vehicles are duplicated by a reflection first from the inner and then the outer surface of the screen, giving a fainter displaced image.

Referring to the embodiment illustrated in Figure 3, 1 is an angularly disposed wind-screen hinged at 2 to the forward edge of the body 3; 4 is the scuttle and 5 a region of light absorbing surface formed on or secured to the scuttle 4 to the rear of the lower edge of the screen; 6 indicates the eye of the driver and 7 the direction of the normal line of vision; 8 is a beam of light entering through the back of the vehicle or from within said vehicle, which beam strikes the screen 1 and is reflected as at 9 onto the surface 5 where it is absorbed. Normally if the surface 5 was of a reflecting nature the beam would be reflected along the dotted line 10 to the screen 1 and thence along the line 11 to the eye 6 of the driver.

Figures 4 to 8 illustrate screens having a different section in a vertical plane and the minimum depth of light absorbing surface 5 required to prevent any light either from the interior or exterior falling on the screen being transmitted to the eye.

In Figure 4 the lower portion of the screen 1 is curved with the convex side towards the driver, the upper portion is curved with the concave side towards the driver and the central portion, through which the normal line of vision 7 passes, is flat, and the region of light absorbing material 5 is flat and disposed at a small angle to the horizontal.

In Figure 5 both the upper and lower portions of the screen 1 hinged at 2 are curved with the concave side towards the driver and the central portion 1ª is approximately flat and the region of light absorbing material 5 may be flat or curved upwardly as shown.

In Figure 6, the screen 1 is composed of two portions 1ᵇ and 1ᶜ; the lower portion 1ᵇ is flat and hinged at 12 along its lower edge and the upper portion 1ᶜ is curved with the concave side towards the driver and is hinged at 13 along its upper edge. An additional light absorbing surface 14 is formed on a sheet of any suitable material hinged at 15 to the upper edge of the portion 1ᵇ of the screen so that said surface 14 may be adjusted to such a position that when viewed from the driver's eye 6 the edge only is visible.

Figure 7:
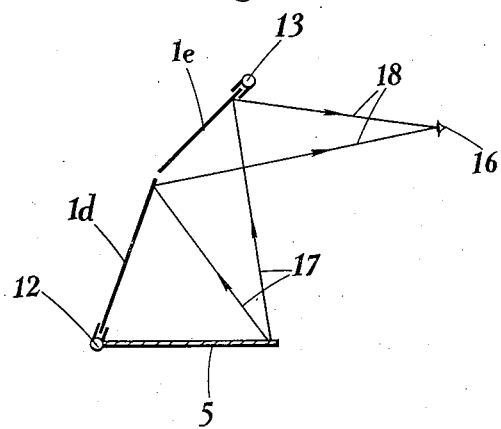

In Figure 7 the screen is composed of two flat portions 1ᵈ and 1ᵉ, the lower portion 1ᵈ being hinged at 12 along its lower edge and the upper portion 1e at 13 along its upper edge.

Figure 8:
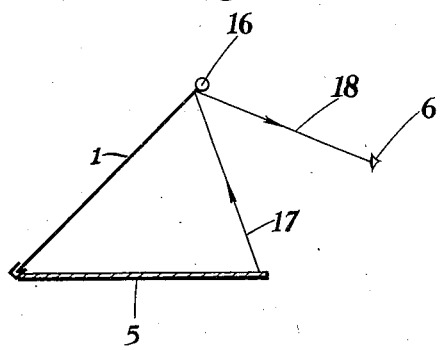

In Figure 8 the screen 1 is flat and is hinged at 16 along its upper edge; in this case the light absorbing surface 5 has to be somewhat wider from front to back.

The direction lines 17—18 in Figures 4 to 8 are intended to indicate that any beams of light falling on the screen or screens from whatever source they may be derived, must necessarily be reflected downwardly onto the light absorbing surface or surfaces by which they are absorbed and cannot therefore be transmitted to the eye.

It will be obvious that the detrimental effect of beams of light entering the vehicle through the front of the screen is minimized by reason of the fact that the light beams from objects in the interior of the vehicle, illuminated by said entering beams, are directed onto the screen and reflected therefrom to the light absorbing surface.

A screen of the type herein described will be particularly useful in dissipating reflections caused by the lights of following or overtaking vehicles entering through the rear window and also lights within the vehicle itself.

What I claim is:—

1. A wind-screen for motor road vehicles comprising in combination a sheet of transparent material mounted in the vehicle at an angle to and adjustable relatively to the normal line of vision, a second sheet of transparent material located above said first named sheet and mounted at an angle to and adjustable relatively to said line of vision, a region of light absorbing material located to the rear of and adjacent the lower edge of said first named sheet and a second region of light absorbing material located to the rear of and adjacent the lower edge of and adjustable relatively to said second named sheet, onto which first and second named regions of light absorbing materials, reflections from said first and second named sheets respectively from surrounding sources of illumination are deflected from said line of vision.

2. A windscreen for motor road vehicles comprising in combination a sheet of transparent material straight in horizontal and vertical section mounted in the vehicle at an angle to and adjustable relatively to the normal line of vision, a second sheet of transparent material straight in horizontal and curved in vertical section located above said first named sheet and mounted at an angle to and adjustable relatively to said line of vision, a region of light absorbing material located to the rear of an adjacent the lower edge of said first named sheet and a second region of light absorbing material located to the rear of and adjacent the lower edge of and adjustable relatively to said second named sheet, onto which first and second named regions of light absorbing materials, reflections from said first and second named sheets, respectively, from surrounding sources of illumination are deflected from said line of vision.

3. In a wind screen for motor road vehicles of the streamline type, the combination of a sheet of transparent material mounted in the vehicle at an angle to the normal line of vision with the lower edge of said material extending forwardly of the vehicle beyond the upper edge of the material and pivoted at its upper edge to the forward portion of the body of the vehicle, and a permanent stationary body of light absorbing material wholly within the vehicle and below the normal area of vision of the vehicle operator, said body of light absorbing material having a wholly unobstructed upper surface and extending from the lower edge of the sheet of transparent material inwardly of the vehicle a distance sufficient to receive any light which may be refracted and reflected by the transparent material to within the vehicle.

WILLIAM WHARTON.